Nov. 17, 1959 J. M. SMITS ET AL 2,913,526

CALLING STATION IDENTIFICATION CIRCUIT

Filed Oct. 21, 1958 3 Sheets-Sheet 1

INVENTORS: J. M. SMITS
M. J. STURTEVANT
BY
Donald M Duft
ATTORNEY

CALLING STATION IDENTIFICATION CIRCUIT

Filed Oct. 21, 1958 3 Sheets-Sheet 2

INVENTORS: J. M. SMITS
M. J. STURTEVANT
BY
Donald M Duft
ATTORNEY

Nov. 17, 1959 J. M. SMITS ET AL 2,913,526

CALLING STATION IDENTIFICATION CIRCUIT

Filed Oct. 21, 1958 3 Sheets-Sheet 3

INVENTORS: J. M. SMITS
M. J. STURTEVANT
BY
Donald M Duft
ATTORNEY

United States Patent Office 2,913,526
Patented Nov. 17, 1959

2,913,526

CALLING STATION IDENTIFICATION CIRCUIT

John M. Smits, El Cerrito, and Michael J. Sturtevant, Berkeley, Calif., assignors to American Telephone and Telegraph Company, a corporation of New York Application October 21, 1958, Serial No. 768,688

5 Claims. (Cl. 179—5.5)

This invention relates to a telephone system and, more particularly, to a system which provides facilities for identifying the calling lines on calls directed to certain preselected called stations.

In the usual day-to-day operation of a telephone system there is usually no necessity for determining the origin of most calls, but, from time to time, occasions arise when such information is desirable, such as for example to assist authorities during crime investigations, or where a subscriber is made the object of an excessive number of calls, which from their timing or nature are extremely annoying.

During the period when nearly all calls were established on a manual basis, situations of this nature were handled by supervisory personnel. Also in the early days of dial operation, for example in offices equipped with step-by-step switches, it was possible, in a comparatively simple manner, to prevent the release of an annoying connection and to trace it back to the calling line. However, with the increase in size and complexity of telephone systems and networks it has heretofore been impracticable to trace such calls.

Therefore, it is an object of the invention to facilitate the identification of the calling lines on calls directed to certain preselected called stations.

It is a further object of the invention to facilitate the tracing of certain preselected calls in a common control switching system.

More recently a telephone system has come into general use which employs crossbar type switches operated by common control circuits in which when trouble occurs, a record is made of the called line number, the calling line or incoming trunk number, and of all the items of equipment used in setting up the connection.

In accordance with the present invention, the Telephone Company, after having been advised of the receipt of annoyance calls by a subscriber, or after having been requested by the public authorities to trace all the calls directed to a particular line, equips one of the common control circuits with a called number translator which is operable to momentarily block the progress of all calls directed to a line under observation. The blocked common control circuit then causes a permanent record to be produced identifying both the calling line or trunk and called line. After this, the call is allowed to proceed to completion. This entire operation is completed in a fraction of a second so that the calling party is completely unaware of the fact that the call was handled in other than a routine manner.

A feature of the invention is the provision of a called number translator in a common control circuit whereby said common control circuit may ascertain the existence of all calls directed to a preselected line.

A further feature of the invention is the provision of a called number translator in a common control circuit whereby said circuit may be effective, upon recognizing the presence of a call directed to a preselected line, to cause a record to be produced identifying the calling line or trunk.

A feature of the invention lies in means whereby said common control circuit translates each called line digit received into a record or a release signal, together with means responsive to a record signal from all of the received digits to cause a trouble record to be made.

A further feature of the invention lies in means under the control of said called number translating means to simulate a trouble condition to the common control circuit to cause a trouble record to be made.

In addition, the simulated trouble signal also prevents the establishment of the desired connection by the common control circuit with which the called number translator is associated, and the subsequent establishment of the desired connection by another common control circuit.

Furthermore, although there is a called number translator associated with each common control circuit, there is also a means operable in the common control circuit which subsequently establishes the connection to render its called number translator ineffective.

The telephone system with which the present invention is intended to function by way of example is disclosed in U.S. Patent 2,585,904, issued February 19, 1952, to A. J. Busch. Details of the trouble recorder used in the operation of the present invention are disclosed in U.S. Patent 2,508,052, issued May 16, 1950, to O. H. Williford.

The invention will be more clearly understood from a consideration of the following detailed description and the accompanying drawings, in which.

Figure 1:
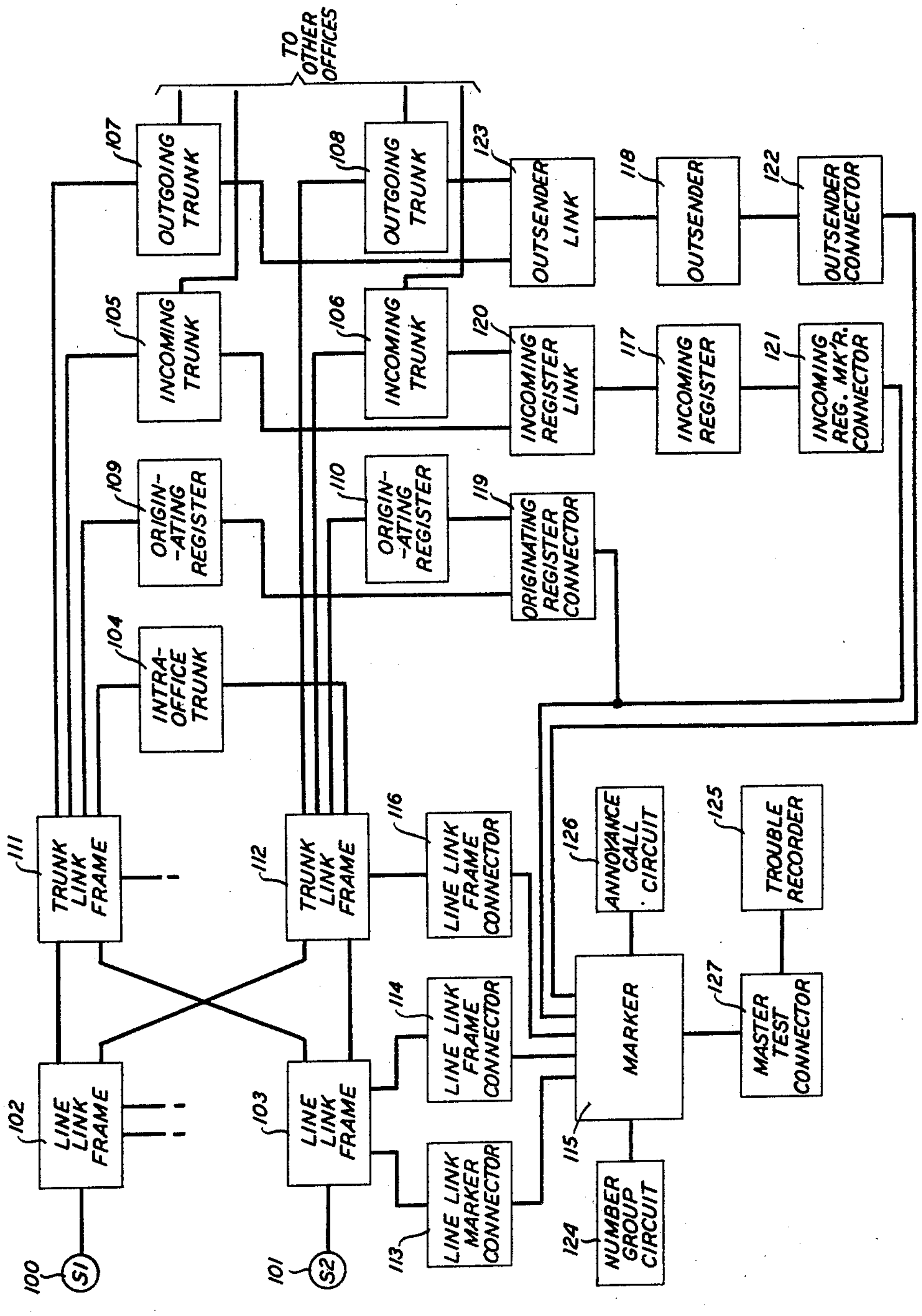
Fig. 1 shows, in schematic form, one complete telephone office.

Referring first to Fig. 1, a general description will be given of the manner in which the system functions. All subscriber lines, such as lines 100 and 101, appear in line link frames, such as frames 102 and 103, while all trunks such as intraoffice trunk 104, incoming trunks 105 and 106 and outgoing trunks 107 and 108, as well as originating registers 109 and 110 appear in trunk link frames, such as frames 111 and 112. The line link frames and trunk link frames are connected by interframe links or junctors so that each line link frame has access to each trunk link frame.

All switching operations are under the control of common markers, such as marker 115, to which connection is made by a variety of connectors. Each line link frame, such as frame 103, has an individual line link marker connector, such as connector 113, and a line link frame connector, such as connector 114. The line link marker connector 113 operates under the control of the line link frame 103 to connect the line link frame 103 with the marker 115 and the line link frame connector 114 operates under the control of the marker 115 to connect the marker with the line link frame 103. There is a trunk link frame connector, such as connector 116, by which the marker obtains access to the associated trunk link frame, such as frame 112.

To assist the marker, originating registers, such as registers 109 and 110, incoming registers such as register 117 and outgoing senders such as sender 118 are employed for receiving and transmitting line designations. Originating registers are connected, under marker control, with the calling line in response to an originating call. A common originating marker connector, such as connector 119, is employed to connect any one of the originating registers with any idle marker. Incoming registers, such as register 117, are common to the incoming trunks, 105, 106, et cetera and are connected therewith by means of an incoming register link 120 to receive the called line designation from the distant office. Incoming register marker connector 121 is employed to connect incoming register 117 with any idle marker.

For an outgoing call, the marker 115, in addition to selecting an outgoing trunk, selects and connects with an out sender, such as sender 118, by means of out sender connector 122, after which sender 118 is connected with the selected trunk by means of out sender link 123.

To further assist the marker, a plurality of number group circuits, such as circuit 124, are provided which translate the numerical designation of the local called line into the location of the line on the line link frame.

The marker 115 is equipped with means for detecting a number of internal troubles in response to which the master test connector 127 is operated to connect the marker with the trouble recorder 125 which produces a punched card record of all the information existing in the marker at the time the record is made, together with the time at which the record is made.

An annoyance call circuit 126, which serves as a called number detector, is connected with each marker whenever it is desired to determine the source of such calls. This circuit functions, as will be described hereinafter, to cause a trouble record card to be made for each call directed to a particular subscriber's number.

As described in detail in the hereinbefore identified Busch patent, when a call is originated, the line link frame on which the calling line appears connects with an idle marker through the line link marker connector. The marker then establishes a second connection with the frame through the line link frame connector. While the marker is connected with the line link frame, it identifies and registers the identification of the calling line in terms of its location on the line link frame.

Seizure of the marker 115 by the line link marker connector 113 tells the marker that this is an originating call. The marker then proceeds to seize an idle originating register, passes the calling line number to the register, connects the seized register with the calling line and then releases.

The calling subscriber receives dial tone from the register and responds by dialing the wanted called line number. The number dialed is registered on digit registers of the originating register. Each digit register comprises five relays which are operated in accordance with a well-known two-out-of-five code.

Figure 2:
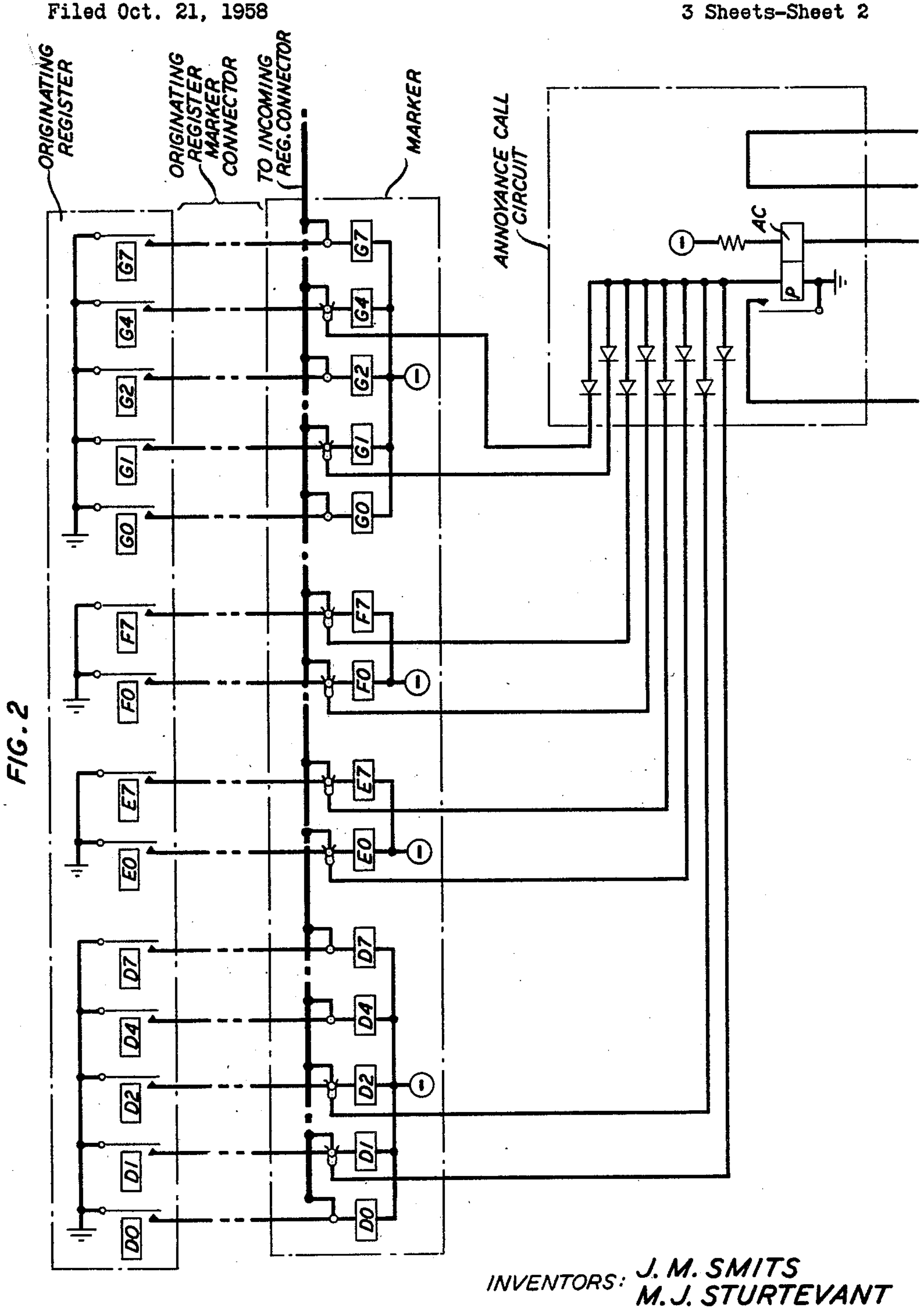
Fig. 2 shows the manner in which the called line number is recorded in the marker, as well as the annoyance call translator.
Figure 3:
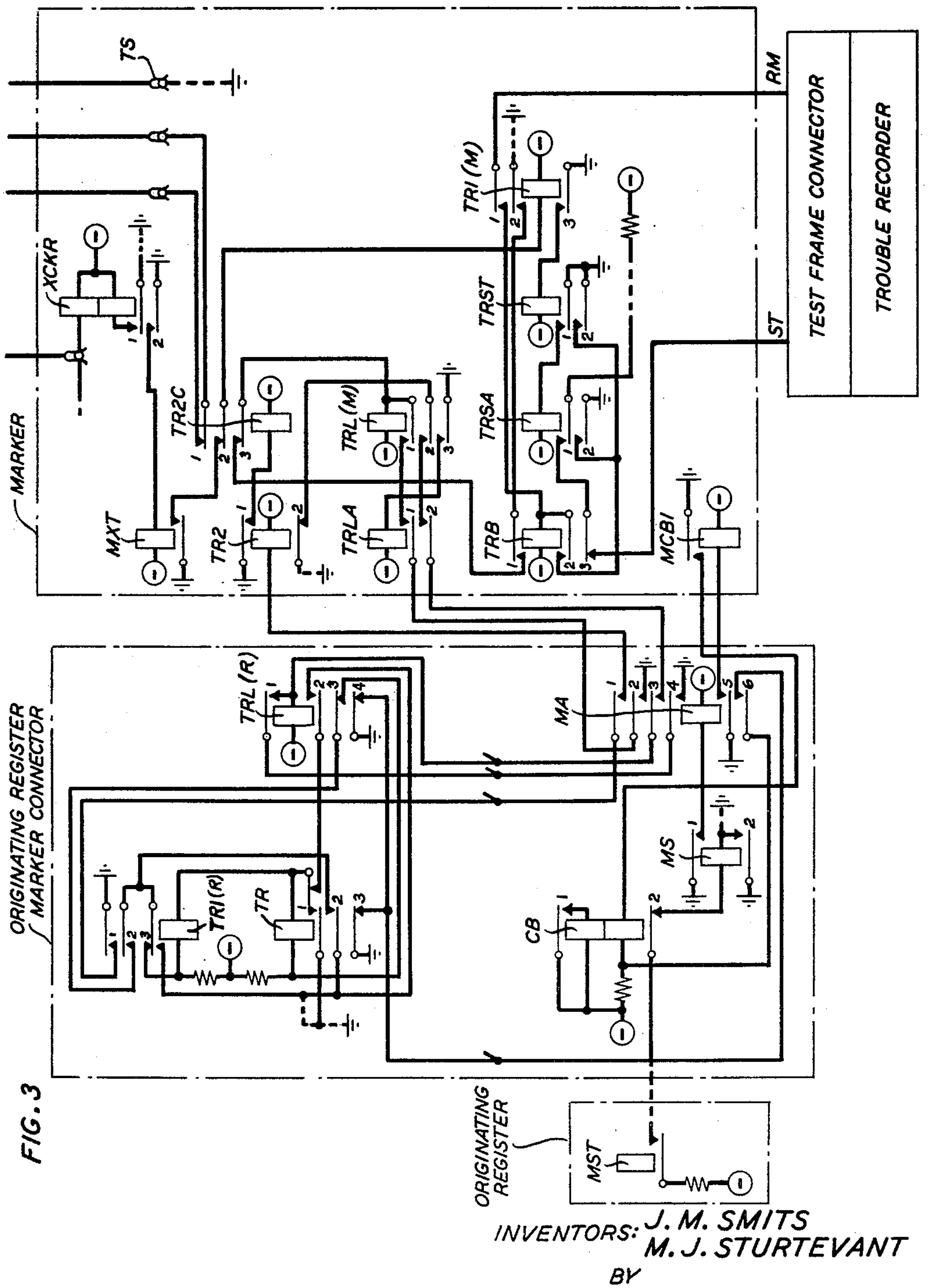
Fig. 3 shows the parts of the marker controlled by the annoyance call translator.

Referring now to Figs. 2 and 3, when the complete number has been registered in the originating register, relay MST therein (Fig. 3) is operated, connecting resistance battery to the marker start circuit. As completely described in the Busch patent, closure of this circuit operates a set of multicontact relays individual to the originating register in the originating register marker connector. One of these relays extends the marker start circuit to select an idle marker by operating a marker start relay. The marker start relays are arranged in a preference chain and are also controlled by chain busy relays. Assuming that the preferred marker is idle, the marker start circuit as shown in Fig. 3, extends from resistance battery, over the front contact of relay MST, over contacts of the register multicontact relays (not shown), contacts 2 of relay CB to ground through the winding of relay MS. Relay MS operates, in turn operating a plurality of multicontact relays individual to the marker in the originating register marker connector and represented by relay MA.

Relay MA, when operated, operates relay MCB1 in the marker, which relay, in turn, connects ground to one side of the lower winding of all of the relays like relay CB in other parts of the originating register marker connector 119, the incoming register marker connectors 121 and the line link marker connectors 113. The other side of these windings is connected to resistance battery and all of the relays operate with the exception of the relay in the connector shown. The operation of these CB relays indicates to the associated circuits that this marker is busy and extends the preference chain to the next marker start relay. In the connector shown, with relay MA operated, a circuit is closed from ground over the contacts 3 of relay TR or over the contacts 4 of relay TRL(R), front contacts 6 of relay MA to the operating winding of relay CB, thereby shunting the resistance battery so that this relay cannot operate.

With the connector operated, all of the information stored in the originating register is transferred to the marker, including the calling line number and the called line number. As completely described in the Busch patent, the marker translates the office code digits and ultimately grounds a code terminal, such as terminal TS, which is cross connected to a route relay to control the establishment of the desired connection.

The numerical designation of the called line is registered in the manner previously mentioned by operating two relays in each of the numerical digit registers, which comprise relays D0–D7, E0–E7, F0–F7 and G0–G7 as shown in Fig. 2. With the multicontact relays of the connector operated, each operated register relay connects ground to the operating circuit for the similarly designated relay in the marker. The normal function of the numerical digit register relays of the marker is fully described in the Busch patent.

Since this invention is concerned with annoyance calls, let it be assumed that the number registered is that of a subscriber who has been troubled by such calls, and that the number is 3775. Under this assumption, relays D1, D2, E0, E7, F0, F7, G1 and G4 will be operated in both the register and the marker.

The annoyance call circuit, shown in Fig. 2, is equipped with means for connecting it with the marker on a temporary or permanent basis as desired. It employs a polarized relay AC, the operating winding of which is connected to terminal TS in the marker so that it only becomes effective when the office code registered is that of the line under observation and for which records are desired. The biasing winding is grounded and connected in multiple to eight varistors. Each varistor is connected by means of a separate conductor to the winding of one of the register relays which will be operated when the number of the annoyed or observed subscriber is called.

Since the number of the annoyed subscriber is 3775, the eight varistors of the annoyance call circuit are connected by the authorized attendant to the operating circuit of relays D1, D2, E0, E7, F0, F7, G1 and G4. The varistors are so poled that when the register is idle, battery through the windings of these register relays will extend through the varistors and the biasing winding of the polarized relay AC to ground, thereby holding the biasing winding operated and the contact of the relay open. Whenever a number is registered in the marker which causes the operation of one or more of the register relays to which the annoyance call circuit is connected, the battery will be shunted from the associated varistor but the biasing winding will remain operated through the other register relays. When the number 3775 is registered, current will cease to flow through the biasing winding. If the proper office code has also been registered, so that terminal TS has been grounded, the operating winding of relaly AC becomes effective to close the relay contacts. It will be noted that the circuit through the operating winding of relay AC is so wired as to include back contacts of one of the second trial relays, relay TR2C, of the marker, for a purpose which will appear hereinafter.

The front contact of relay AC is wired to the winding of relay XCKR in the marker so that relay XCKR is operated whenever the annoyance call circuit detects a call for number 3775. This relays is normally used to detect a cross connection at a later stage of operation of the marker, and when it is so operated, it causes a record to be produced which includes indicia which will clearly distingiush the annoyance call record from a true trouble record.

When relay XCKR operates, it locks to off-normal ground and closes an obvious circuit for relay MXT. Relay MXT, when operated, operates a stop-progress relay which prevents the marker from setting up the indicated connection and, in addition, closes a circuit over back contacts 2 of relay TR2C to battery through the winding of trouble relay TR1(M). Relay TR1(M) operates and in turn operates relays TRST and TRSA. Relay TRSA connects resistance battery over back contacts 3 of relay TRB to the trouble recorder start lead ST, thereby causing the test frame connector to connect the marker with the trouble recorder.

The trouble recorder functions as described in the above-identified Williford patent to make a punched card record of all of the information stored in the marker as well as of the time at which the record was made.

When the trouble recorder has completed its operation, it signals the test frame connector, which, in turn, connects ground to conductor RM as an indication that the record has been made. Ground on conductor RM is extended over the front contact of relay TR1(M) to battery through the winding of relay TRB. Relay TRB operates in this circuit and locks under the control of relays TRST and TRSA. With relay TRB operated, the start circuit for the trouble recorder is opened and the test frame connector disconnects the trouble recorder from the marker.

Relay TRB, in operating, closes a circuit from off-normal ground, over front contacts 2 of relay TR1(M), front contacts 1 of relay TRB, back contacts 3 of relay TR2C to battery through the winding of relay TRL(M). Relay TRL(M) in turn, operates relay TRLA and, with relay TRLA operated, locks to ground over front contacts 1 of relay TRLA and front contacts 2 of multicontact relay MA in the connector. In addition, relay TRLA, when operated, closes a circuit from ground on contacts 2 of relay TR2, contacts 2 of relay TRL(M), contacts 2 of relay TRLA, contacts 3 of relay MA to battery through the winding of relay TRL(R) in the connector.

Relay TRL(R) operates in this circuit and locks under the control of relay MA. Relay TRL(R) in operating, opens at one point (its contacts 4) the shunt around the operating winding of relay CB. In addition, relay TRL(R) closes a circuit from off-normal ground in the connector, front contacts 2 of relay TRL(R), normally closed contacts 1 and winding of relay TR, to resistance battery. Relay TR operates in this circuit, locks to off-normal ground and opens its operating circuit. Relay TR closes a circuit from resistance battery, through the winding of relay TR1(R) to ground over the locking circuit of relay TR. However, relay TR1(R) cannot operate at this time, since it is shunted by a branch of the operating circuit for relay TR over its own back contacts 3.

Relay TR, in operating, opens the shunt around the operating circuit of relay CB at its break contacts 3 and relay CB now operates. With relay CB operated, the circuit of relay MS is opened and that relay releases, in turn releasing multi-contact relay MA, and releasing the marker.

With relay CB operated, the marker start circuit, which remains closed in the originating register is extended over the front contact of relay CB to the relays like relay CB and MS individual to the next idle marker, and that marker is connected with the originating register.

When relay MA released, it opened the locking circuit for relay TRL(R) and that relay released, opening the shunt around the winding of relay TR1(R) and permitting it to operate.

When the second marker is connected with the originating register, a multicontact relay like relay MA individual to that marker is operated. Since relay TR1(R) is now operated, a circuit is closed from ground over front contacts 1 of relay TR1(R), front contacts 1 of the second MA relay to the winding of the TR2 in the second marker. Relay TR2, when operated, operates relay TR2C so that, when the annoyance call circuit associated with the second marker detects the number 3775, the operating circuit for relay AC is open, neither relay AC nor relay XCKR can operate, and the call is completed in the normal manner.

Since both the marker and the trouble recorder operate very rapidly, the calling subscriber will not be aware that a record has been made of the call.

By comparing the times appearing on the trouble record cars with the times of the annoyance calls complained of, the source of the calls may be determined.

While the invention is most effective where the calling and called lines are in the same office, it is quite possible that the calling number may be determined, even when the calling line is in another office. As indicated in Fig. 2 and as described in the Busch patent, the numerical digit registers in the marker are also used for receiving the called line number from incoming registers. Under this condition, of course, the calling line number will not appear on the trouble record cards, but the incoming trunk and thereby the calling office will be identified. The annoyance call circuit may then be set up in the calling office and when the annoyance call circuit detects the registration of the called number for which it is set, the resulting trouble record card will include the calling number.

What is claimed is:

1. In a telephone switching system, a common control circuit into which is registered the called station directory number during each call, a recorder associated with said common control circuit and operable to produce a record indicating the identity of the calling station, a translator connected to said common control circuit, and means operable by said translator upon the registration in said common control circuit of a predetermined called station directory number to effect the operation of said recorder.

2. In a telephone switching system as set forth in claim 1, the registered directory number comprises a number of digits, each of which said translator translates into a record signal or a release signal, and is responsive only to a record signal from each digit registered.

3. In a telephone switching system, a common control circuit into which is registered the called station directory number during each call, a recorder associated with said common control circuit and operable in response to a trouble indication to produce a record indicating the identity of the calling station, a translator connected to said common control circuit, and means operable by said translator upon the registration in said common control circuit of a predetermined called station directory number to transmit a simulated trouble indication to said common control circuit to effect the operation of said recorder.

4. In a telephone switching system, a plurality of common control circuits into one of which is registered the called station directory number during each call, a recorder associable with any one of said common control circuits and operable in response to a trouble indication to produce a record indicating the identity of the calling station, a translator connected to each of said common control circuits, means operable by a first one of said translators upon the registration in the connected first common control circuit of a predetermined called station directory number to transmit a simulated trouble indication to said first common control circuit to effect the operation of said recorder, and means responsive to said simulated trouble indication to release said first common control circuit and register said called station directory number in a second common control circuit.

5. In a telephone switching system, a plurality of common control circuits into one of which is registered the called station directory number during each call, a recorder associable with any one of said common control circuits and operable in response to a trouble indication to produce a record indicating the identity of the calling station, a translator individually connected to each of said common control circuits, means operable by a first one of said translators upon the registration in the connected first common control circuit of a predetermined called station directory number to transmit a simulated trouble indication to said first common control circuit to effect the operation of said recorder, means responsive to said simulated trouble indication to release said first common control circuit and register said called station directory number in a second common control circuit, and means in said second common control circuit to render the translator connected therewith ineffective.

No references cited.